(12) United States Patent
Feng et al.

(10) Patent No.: US 12,316,261 B2
(45) Date of Patent: May 27, 2025

(54) POWER TOOL AND CONTROL METHOD THEREFOR

(71) Applicant: Nanjing Chervon Industry Co., Ltd., Nanjing (CN)

(72) Inventors: Jifeng Feng, Nanjing (CN); Xiancheng Fan, Nanjing (CN); Zengbing Guo, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 225 days.

(21) Appl. No.: 18/318,241

(22) Filed: May 16, 2023

(65) Prior Publication Data

US 2023/0283220 A1 Sep. 7, 2023

Related U.S. Application Data

(63) Continuation of application No. PCT/CN2021/131632, filed on Nov. 19, 2021.

(30) Foreign Application Priority Data

Dec. 30, 2020 (CN) .......................... 202011630174.8
Apr. 7, 2021 (CN) .......................... 202110370760.1

(51) Int. Cl.
*H02P 6/08* (2016.01)
*A01D 69/02* (2006.01)
*H02P 27/08* (2006.01)

(52) U.S. Cl.
CPC ............ *H02P 27/085* (2013.01); *A01D 69/02* (2013.01); *H01M 2220/30* (2013.01)

(58) Field of Classification Search
CPC ........... H02P 27/085; H02P 6/24; H02P 3/14; H01M 2220/30; H02J 7/14
See application file for complete search history.

(56) References Cited

U.S. PATENT DOCUMENTS

2014/0059959 A1    3/2014  Salazar
2017/0373614 A1*  12/2017  Lewis .................... B24B 23/028
2018/0013360 A1*   1/2018  Eshleman ................. H02P 3/22

FOREIGN PATENT DOCUMENTS

CN      201541473 U      8/2010
CN      106532794 A      3/2017
(Continued)

OTHER PUBLICATIONS

ISA/CN, International Search Report issued on PCT application No. PCT/CN2021/131632, dated Feb. 7, 2022, 6 pages.
(Continued)

*Primary Examiner* — Muhammad S Islam
(74) *Attorney, Agent, or Firm* — Greenberg Traurig, LLP

(57) ABSTRACT

A power tool includes an electric motor; a battery pack for providing a power supply; a switching circuit for outputting a power-on signal or a shutdown signal; a first switching device for controlling a power-on state of the electric motor; a second switching device for driving the electric motor to rotate; and a controller electrically connected to at least the first switching device, the switching circuit, and the second switching device. The controller is configured to, when the power-on signal is detected, control the first switching device and the second switching device to control, in a first working mode, the electric motor to rotate and when the shutdown signal is detected, control the first switching device and the second switching device to control, in a second working mode, the electric motor to rotate.

18 Claims, 8 Drawing Sheets

(56) References Cited

FOREIGN PATENT DOCUMENTS

| | | | |
|---|---|---|---|
| CN | 107000184 | A | 8/2017 |
| CN | 107969125 | A | 4/2018 |
| CN | 109150063 | A | 1/2019 |
| CN | 111384771 | A | 7/2020 |
| EP | 3142219 | A1 | 5/2018 |
| EP | 3257351 | A1 | 6/2019 |
| JP | 05192027 | A | 8/1993 |
| JP | 2000197204 | A | 7/2000 |
| JP | 2011147375 | A | 8/2011 |

OTHER PUBLICATIONS

ISA/CN, English translation of International Search Report issued on PCT application No. PCT/CN2021/131632, dated Feb. 7, 2022, 4 pages.

ISA/CN, Written Opinion issued on PCT application No. PCT/CN2021/131632, dated Feb. 7, 2022, 4 pages.

ISA/CN, English translation of Written Opinion issued on PCT application No. PCT/CN2021/131632, dated Feb. 7, 2022, 4 pages.

\* cited by examiner

POWER TOOL AND CONTROL METHOD THEREFOR

RELATED APPLICATION INFORMATION

This application is a continuation of International Application Number PCT/CN2021/131632, filed on Nov. 19, 2021, through which this application also claims the benefit under 35 U.S.C. § 119(a) of Chinese Patent Application No. 202011630174.8, filed on Dec. 30, 2020, and Chinese Patent Application No. 202110370760.1, filed on Apr. 7, 2021, which applications are incorporated herein by reference in their entirety.

BACKGROUND

A self-propelled device is a commonly used large-scale garden power tool. To facilitate operation, a high-current switch, that is, a mechanical switch, of the self-propelled device is generally provided on a handle of the self-propelled device. However, the high-current switch has relatively large electron radiation, resulting in excessive electron radiation at the handle. In addition, in the braking process of the power tool, the method of short-circuiting three-phase windings is usually used for braking. When this method is used for braking, the current is uncontrollable, the larger current may damage a power device, and the energy is converted into heat and consumed instead of being effectively used during braking, resulting in a waste of energy.

SUMMARY

A power tool includes an electric motor; a switching circuit for outputting a power-on signal or a shutdown signal; a battery pack for providing a power supply; a first switching device for controlling a power-on state of the electric motor; a second switching device for driving the electric motor to rotate; and a controller electrically connected to at least the first switching device, the switching circuit, and the second switching device. The controller is configured to, when the power-on signal is detected, control the first switching device and the second switching device to control, in a first working mode, the electric motor to rotate and when the shutdown signal is detected, control the first switching device and the second switching device to control, in a second working mode, the electric motor to rotate.

In one example, the controller is configured to, when the power-on signal is detected, control the first switching device to be turned on and in a first preset time, control the second switching device to be turned on, where the battery pack forms a first conducting loop with at least the first switching device, the electric motor, and the second switching device and when the shutdown signal is detected, control the second switching device to be turned off, control the first switching device to be turned off, and in a second preset time, control the second switching device to be turned on, where the electric motor forms a second conducting loop with at least the first switching device, the battery pack, and the second switching device.

In one example, the first switching device includes a relay.

In one example, in the first conducting loop, the battery pack outputs electrical energy to supply power to the electric motor; and in the second conducting loop, the electric motor outputs generated electrical energy to charge the battery pack.

In one example, the second preset time is greater than or equal to zero and less than or equal to the first preset time.

In one example, the power-on signal or the shutdown signal outputted by the switching circuit is transmitted to the controller through bus communication.

In one example, the power tool includes a driver circuit connected between the controller and the second switching device and used for controlling an on state and an on frequency of the second switching device.

A control method for a power tool is provided. The power tool includes an electric motor; a switching circuit for outputting a power-on signal or a shutdown signal; a battery pack for providing a power supply; a first switching device for controlling a power-on state of the electric motor; a second switching device for driving the electric motor to rotate; and a controller electrically connected to at least the first switching device, the switching circuit, and the second switching device. The control method includes when the power-on signal is detected, controlling the first switching device and the second switching device to control, in a first working mode, the electric motor to rotate; and when the shutdown signal is detected, controlling the first switching device and the second switching device to control, in a second working mode, the electric motor to rotate.

In one example, the method further includes when the power-on signal is detected, controlling the first switching device to be turned on and in a first preset time, controlling the second switching device to be turned on, where the battery pack forms a first conducting loop with at least the first switching device, the electric motor, and the second switching device; and when the shutdown signal is detected, controlling the second switching device to be turned off, controlling the first switching device to be turned off, and in a second preset time, controlling the second switching device to be turned on, where the electric motor forms a second conducting loop with at least the first switching device, the battery pack, and the second switching device.

In one example, the first switching device includes a relay.

A power tool includes an electric motor having a rotor and multiple stator windings; a brake element for outputting a brake instruction for braking the electric motor; a battery pack for providing a power supply for driving the electric motor; an inverter circuit having multiple semiconductor switching elements for switching energized states of the multiple stator windings; a current detection unit for detecting a phase current of the multiple stator windings in the electric motor; and a controller connected to at least the brake element, the current detection unit, and the inverter circuit. The controller is configured to acquire the phase current of the multiple stator windings, estimate the position of the rotor of the electric motor according to the phase current, acquire the brake instruction outputted by the brake element, and control on states of the multiple switching elements in the inverter circuit according to the brake instruction and the position of the rotor so that the electric motor obtains brake torque for reverse acceleration to implement torque brake.

In one example, under the action of the brake torque, the multiple stator windings of the electric motor generate a brake current; and the brake current flows into the battery pack to charge the battery pack.

In one example, the brake instruction includes a rotational speed reduction instruction for reducing the rotational speed of the electric motor, where the rotational speed reduction instruction is capable of including multiple rotational speed gears, and different rotational speed gears correspond to brake torque of different magnitudes.

In one example, the controller is configured to calculate the rotational speed of the electric motor according to the phase current of the multiple stator windings; when the rotational speed is greater than or equal to a first rotational speed threshold, estimate a back electromotive force of the multiple stator windings based on the phase current and estimate the position of the rotor of the electric motor according to the back electromotive force; and when the rotational speed is less than or equal to a second rotational speed threshold, estimate the position of the rotor of the electric motor based on a high-frequency electrical signal loaded to the multiple stator windings.

In one example, the controller is configured to, when the rotational speed is less than or equal to the second rotational speed threshold, output the high-frequency electrical signal, load the high-frequency electrical signal to the multiple stator windings of the electric motor, acquire a response signal outputted by the multiple stator windings based on the high-frequency electrical signal, and estimate the position of the rotor of the electric motor according to a relative relationship between the response signal and a preset rotor position.

The power tool further includes a voltage detection unit for detecting a bus voltage of the inverter circuit. The controller is configured to acquire the bus voltage, and when the bus voltage is greater than a preset voltage threshold, control the brake element to change a control instruction so that the magnitude of the brake current is less than a set back-charge current threshold.

A control method for a power tool is provided. The power tool includes an electric motor having a rotor and multiple stator windings; a brake element for outputting a brake instruction for braking the electric motor; a battery pack for providing a power supply for driving the electric motor; an inverter circuit having multiple semiconductor switching elements for switching energized states of the multiple stator windings; a current detection unit for detecting a phase current of the multiple stator windings in the electric motor; and a controller connected to at least the brake element, the current detection unit, and the inverter circuit. The control method includes acquiring the phase current of the multiple stator windings and estimating the position of the rotor of the electric motor according to the phase current; and acquiring the brake instruction outputted by the brake element and controlling on states of the multiple switching elements in the inverter circuit according to the brake instruction and the position of the rotor so that the electric motor obtains brake torque for reverse acceleration to implement torque brake.

In one example, under the action of the brake torque, the multiple stator windings of the electric motor generate a brake current; and the brake current flows into the battery pack to charge the battery pack.

In one example, the brake instruction includes a rotational speed reduction instruction for reducing the rotational speed of the electric motor, where the rotational speed reduction instruction is capable of including multiple rotational speed gears, and different rotational speed gears correspond to brake torque of different magnitudes.

In one example, the rotational speed of the electric motor is calculated according to the phase current of the multiple stator windings; and when the rotational speed is greater than or equal to a first rotational speed threshold, a back electromotive force of the multiple stator windings is estimated based on the phase current and the position of the rotor of the electric motor is estimated according to the back electromotive force.

When the rotational speed is less than or equal to a second rotational speed threshold, the position of the rotor of the electric motor is estimated based on a high-frequency electrical signal loaded to the multiple stator windings.

In one example, when the rotational speed is less than or equal to the second rotational speed threshold, the high-frequency electrical signal is outputted, the high-frequency electrical signal is loaded to the multiple stator windings of the electric motor, and a response signal outputted by the multiple stator windings based on the high-frequency electrical signal is acquired; and the position of the rotor of the electric motor is estimated according to a relative relationship between the response signal and a preset rotor position.

DETAILED DESCRIPTION

Figure 1:
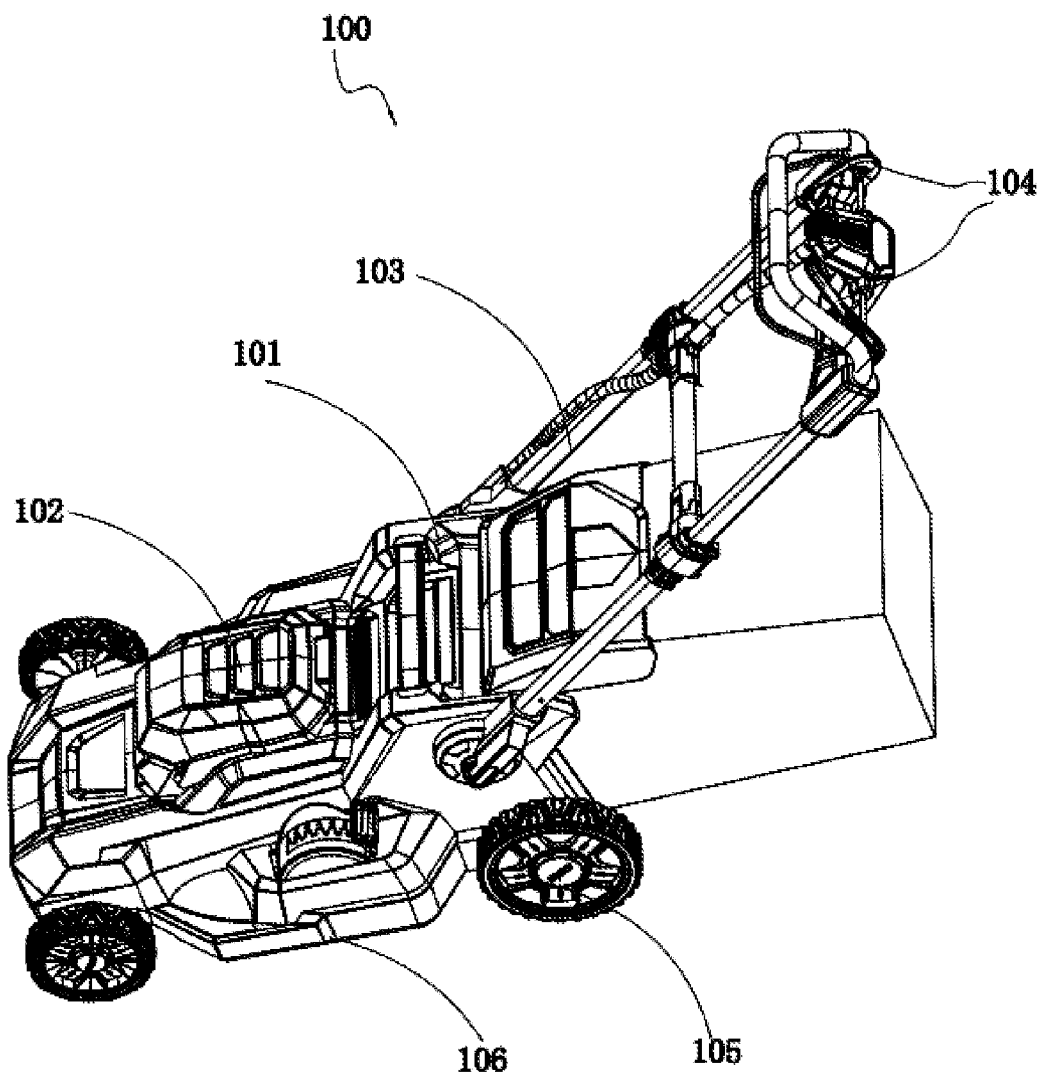
FIG. 1 is a structural view of a mower as an example.

The present application is described below in detail in conjunction with drawings and examples. It is to be understood that the examples described herein are intended to explain the present application and not to limit the present application. Additionally, it is to be noted that to facilitate description, only part, not all, of structures related to the present application are illustrated in the drawings.

It is to be noted that a self-propelled device in the present application may include an automated cleaning device, an automatic watering device, an autonomous snow thrower, and another device that can be moved by manipulation. In the present application, a mower is used as an example for description.

Referring to a structural diagram of a mower shown in FIG. 1, a mower 100 includes a body 101, a battery pack 102, a handle 103, a self-propelled operation switch 104, driving wheels 105, and a cutting accessory 106. The battery pack 102 is used as a power supply and may be composed of a group of battery cells. For example, the battery cells may be connected in series to form a single power supply branch to form a 1P battery pack. The handle 103 is used by a user to operate the mower. The self-propelled operation switch 104 may be a handlebar switch shown in FIG. 1 or a pushbutton switch or another type of electronic switch. When the user presses the self-propelled operation switch 104, the self-propelled device enters a driving state. When the user releases the self-propelled operation switch 104, the self-propelled device enters a braking state. The driving wheels 105 are driven by an electric motor to travel and drive traveling wheels to travel. The driving wheels 105 and the cutting accessory 106 such as a cutting blade may be driven by the same electric motor or driven by different electric motors.

Figure 2:
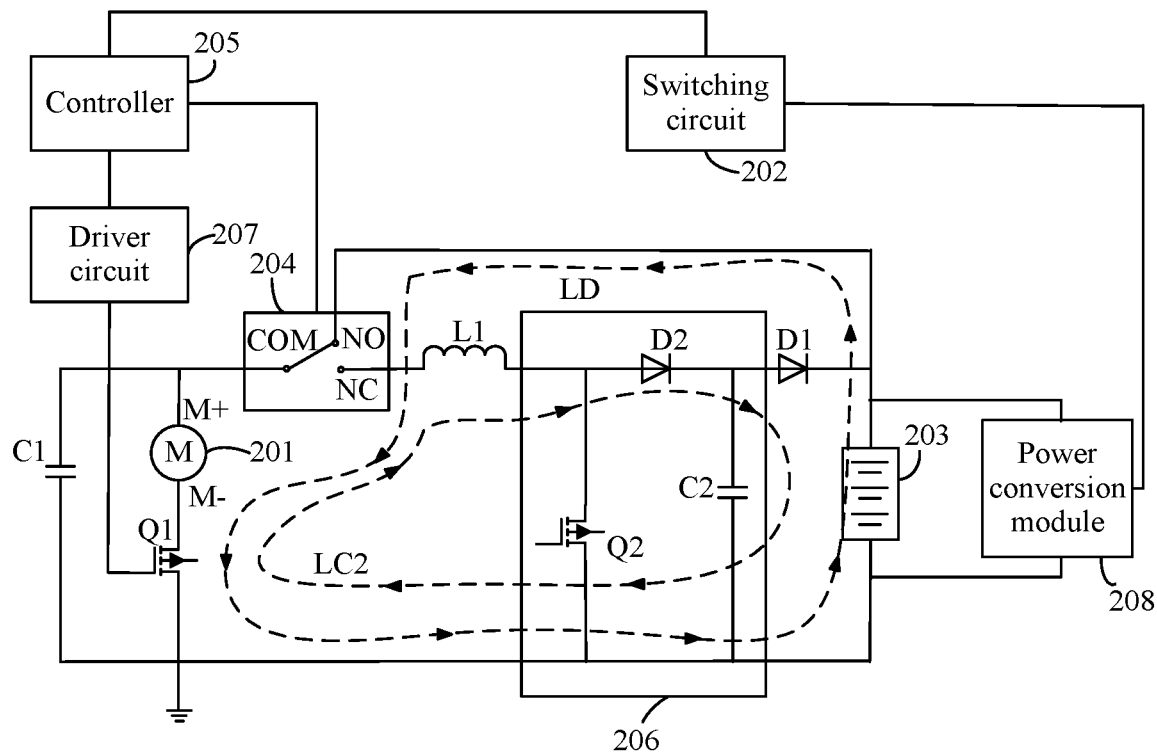
FIG. 2 is a circuit block diagram of a mower as an example.

Referring to a circuit block diagram of a mower shown in FIG. 2, the mower may include an electric motor 201, a switching circuit 202, a battery pack 203, a first switching device 204, a controller 205, a boost circuit 206, a driver circuit 207, a power conversion module 208, an inductor L1, a second switching device Q1, a protection capacitor C1, and a diode D1.

In this example, the electric motor 201 is a direct current brushless motor with a positive port M+ and a negative port M−.

Figure 3:
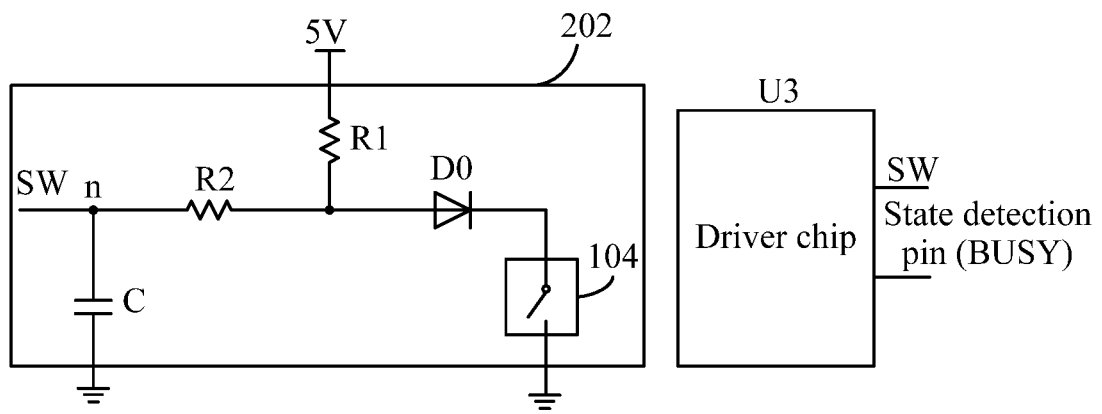
FIG. 3 is a circuit diagram of a switching circuit in a mower as an example.

In an example, as shown in FIG. 3, the switching circuit 202 includes at least a pull-up resistor R1, a voltage divider resistor R2, a signal output terminal SW, a protection capacitor C, a diode DO, and the self-propelled operation switch 104. Specifically, when the self-propelled operation switch 104 is pressed and turned on, a voltage at a node n is low, and the signal output terminal SW outputs a low-level digital signal 0; and when the self-propelled operation switch 104 is turned off, the voltage at the node n is high, and the signal output terminal SW outputs a high-level digital signal 1. Usually, the switching circuit 202 outputs the low-level signal 0 that represents a power-on signal, that is, the device enters the driving state; and the switching circuit 202 outputs the high-level signal 1 that represents a shutdown signal, that is, the device enters the braking state. Optionally, the switching circuit 202 shown in FIG. 3 further includes a signal transmission control chip U3, one pin of the signal transmission control chip U3 is connected to the signal output terminal SW and used for receiving the power-on signal and the shutdown signal, and one pin BUSY is used as a state detection pin for determining whether a signal transmission bus is idle. It is to be understood that the signal transmission control chip U3 transmits the power-on signal and the shutdown signal to the controller 205 only when detecting that the bus is in an idle state, otherwise the signal transmission control chip U3 does not transmit the power-on signal or the shutdown signal.

Figure 4:
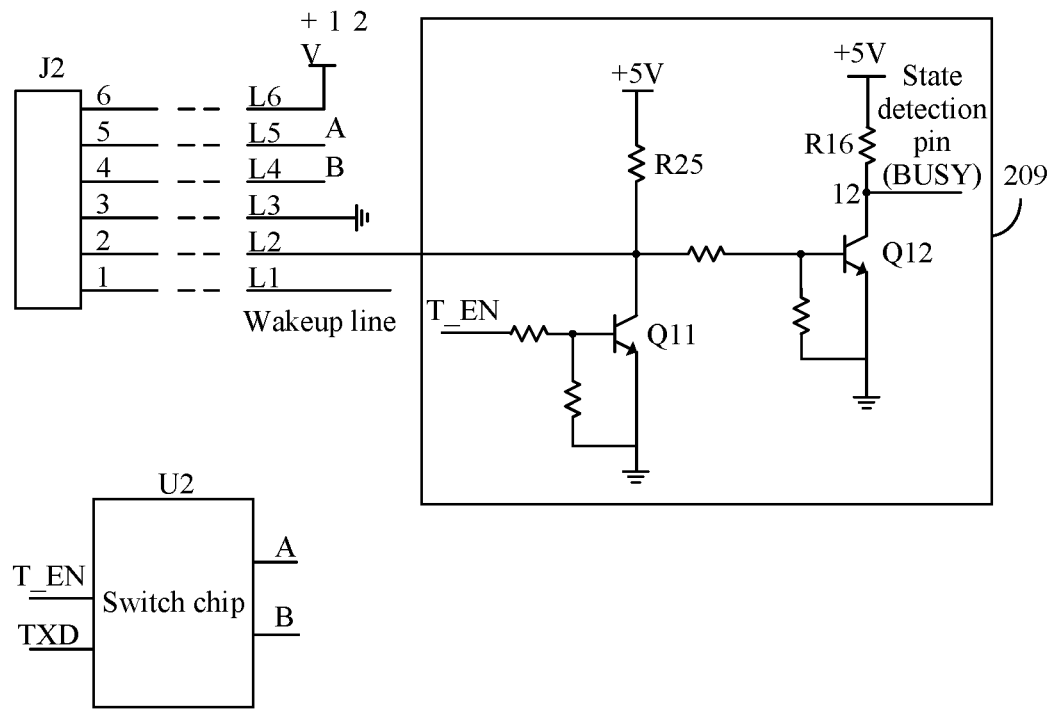
FIG. 4 is a circuit diagram illustrating bus communication in a mower as an example.

In an example, the switch signal outputted by the switching circuit 202 may be transmitted to the controller 205 through bus communication. A bus communication circuit shown in FIG. 4 mainly includes six communication lines L1 to L6 corresponding to six interfaces 1 to 6 of a signal output port J2, a switch chip U2, and a bus state detection circuit 209. The switch signal is transmitted to the switch chip U2 based on an input terminal TXD, processed by the switch chip U2, and then outputted through pins A and B. Among the communication lines, L6 is connected to the power supply, L3 is grounded, L1 is used as a wakeup line, L2 is a bus state detection line, and L4 and L5 are switch signal receiving lines and connected to the output pins A and B of the switch chip U2. The bus state detection circuit 209 includes at least switching elements Q11 and Q12, a first pull-up resistor R25, and a second pull-up resistor R16. The first pull-up resistor R25 is connected in series with the switching element Q11, and the second pull-up resistor R16 is connected in series with the switching element Q12. A bus state output interface BUSY transmits the current state of the bus to the signal transmission control chip U3 in the switching circuit. Other voltage divider resistors are not introduced one by one without affecting the understanding of the bus state detection circuit. Specifically, when an enable terminal T_EN is at a high level, the switching element Q11 is turned on, the switching element Q12 is not turned on, and a voltage at a node 12 is high so that the output interface BUSY outputs a data signal 1 that represents a high level. When the enable terminal T_EN is at a low level, the switching element Q11 is not turned on, the switching element Q12 is turned on, and the voltage at the node 12 is low so the output interface BUSY outputs a data signal 0 that represents a low level. When BUSY outputs a high level, the bus is in a busy state, and when BUSY outputs a low level, the bus is in the idle state. It is to be understood that when BUSY is at a low level and the bus is in the idle state, the power-on signal and the shutdown signal from the signal transmission control chip U3 are transmitted to the controller 205 through the switch chip U2, the bus, and the signal output port J2. Correspondingly, a receiving port (not shown) corresponding to the signal output port J2 exists in the controller 205.

It is to be noted that the present application only exemplifies chip pins and a peripheral circuit and should not be limited to the provided example circuit. Any other circuit connections that can implement the preceding functions are within the scope of the present application.

In an example of the present application, the first switching device 204 may be a relay or another type of controllable electronic component, such as a transistor, a triode, a metal-oxide-semiconductor field-effect transistor (MOSFET), an analog switch, or a solid state relay. The second switching device Q1 may be a drive switch, for example, a controllable semiconductor power device (such as a field-effect transistor (FET), a bipolar junction transistor (BJT), or an insulated-gate bipolar transistor (IGBT)) or any other types of solid state switches, such the IGBT and the BJT.

Figure 5:
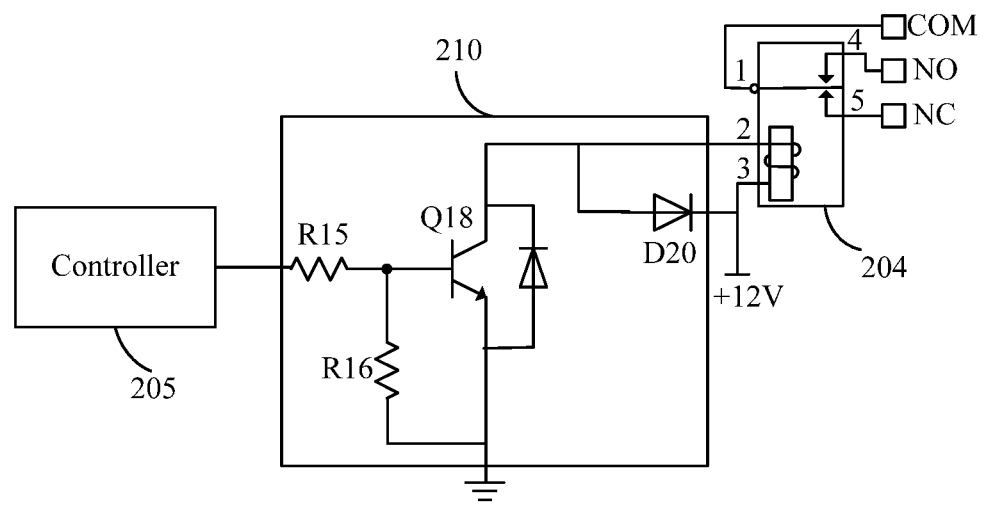
FIG. 5 is a control circuit diagram of a relay in a mower as an example.

A relay control circuit shown in FIG. 5 includes a relay 204, the controller 205, and a relay control module 210, where the relay 204 includes five pins, specifically contacts 1, 4, and 5 and output terminals 2 and 3 of an iron core. The contacts 1, 4, and 5 of the relay correspond to external contacts COM, NO, and NC, respectively. A voltage divider diode D20 is connected in parallel between the output terminals 2 and 3 of the iron core. An anode of the diode D20 is connected to a switching element Q18. A base of Q18 is connected to voltage divider resistors R15 and R16. An input terminal of the voltage divider resistor R15 is connected to the controller 205 and used for receiving a control signal that is outputted by the controller and used for controlling a pull-in state of the relay. Specifically, when the iron core of the relay is not powered on, the contacts 1 and 5 are in a connection state; and only when the iron core is energized, pins are pulled in through the contacts 1 and 4 and the relay is turned on. Therefore, when the switching element Q18 is turned on, pins 2 and 3 are energized, that is, the iron core is energized, the contacts 1 and 4 are pulled in, that is, contacts COM and NO are turned on, and the relay 204 is in an on state; when the switching element Q18 is turned off, the pins 2 and 3 are not energized, and when the contacts COM and NC are connected, the relay 204 is in a disconnected state. In this manner, the controller 205 may control the on state of the switching element Q18 according to the power-on signal and the shutdown signal outputted by the switching circuit 202, thereby controlling the connection state of the contacts of the relay. Specifically, when detecting the power-on signal, the controller 205 controls the switching element Q18 to be turned on so that the contacts COM and NO of the relay are pulled in; and when detecting the shutdown signal, the controller 205 controls the switching element Q18 to be turned off so that the contacts COM and NC of the relay are connected.

As shown in FIG. 2, the boost circuit 206 includes a switching element Q2, a capacitor C2, and a diode D2 and can boost the electrical energy outputted by the battery pack to supply power to the electric motor 201.

Figure 6:
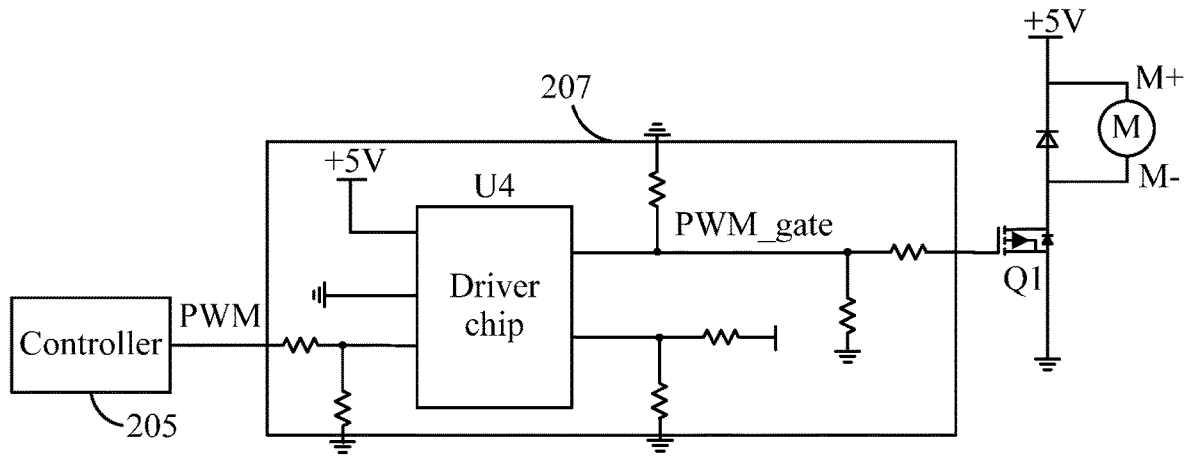
FIG. 6 is a circuit diagram of a driver circuit in a mower as an example.

As shown in FIG. 6, the driver circuit 207 includes a driver chip U4 and a peripheral circuit of the driver chip. The driver chip can enhance a drive signal outputted by the controller 205 to control the on state and on frequency of the second switching device Q1, thereby controlling the rotational speed of the electric motor 201. For example, a pulse-width modulation (PWM) control signal outputted by the controller 205 is enhanced by the driver chip U4 and outputted as PWM_gate so as to drive the on frequency and on state of the second switching device Q1. The peripheral circuit of the driver chip U4 is not described in detail without affecting the understanding of the driver circuit 207.

The power conversion module 208 can convert the electrical energy supplied by the battery pack into the electrical energy powering the switching circuit 202.

In a specific implementation, in the circuit shown in FIG. 2, the positive electrode M+ of the electric motor is connected to the contact COM of the relay 204, and the negative electrode M− of the electric motor is connected to a drain of the second switching device Q1. The controller 205 is electrically connected to at least the switching circuit 202, the relay 204, and the second switching device Q1, and the controller 205 may obtain the switch signal outputted by the switching circuit 202 and determine a working state of the device according to the switch signal, such as the driving state or the braking state. Further, in different working states, the controller 205 may control the relay 204 and the second switching device Q1 to control, in different working modes, the electric motor to rotate. Specifically, in the driving state, the controller 205 may control the relay 204 and the second switching device Q1 to control, in a first working mode, the electric motor to rotate; and in the braking state, the controller 205 may control the relay 204 and the second switching device Q1 to control, in a second working mode, the electric motor to rotate. The working modes of the relay 204 and the second switching device Q1 mainly refer to the working modes formed by combinations of different sequences in which the relay 204 and the second switching device Q1 are on and on states of the relay 204 and the second switching device Q1. The first working mode refers to a working mode in which the relay 204 is turned on first and in a first preset time, the second switching device Q1 is turned on. The second working mode refers to a working mode in which the second switching device Q1 is turned off first, the relay 204 is turned off immediately, and in a second preset time, the second switching device Q1 is turned on. Particularly, the second preset time is greater than or equal to zero and less than or equal to the first preset time.

In the present application, processes of the controller 205 controlling, according to the detected switch signal, the electric motor to rotate are described below.

A process of controlling the electric motor to rotate in the driving state is as follows: the self-propelled operation switch 104 is pressed, the switching circuit 202 outputs a low-level data signal 0 that represents the power-on signal, and when detecting that the bus is idle, the signal transmission control chip U3 in the switching circuit 202 outputs the power-on signal to the controller 205 through bus communication. The controller 205 turns on the switching element Q18 in the control circuit of the relay 204 so that the contacts COM and NO of the relay 204 are connected and in the first preset time, the second switching element Q1 is controlled to be turned on. Therefore, the battery pack 203 forms a first conducting loop LD with the relay 204, the electric motor 201, and the second switching device Q1, the battery pack 203 outputs the electrical energy to supply power to the electric motor, a direction of a power supply current is shown by arrows in FIG. 2, and the electric motor 201 starts to rotate and then drives the device to travel. It is to be understood that the battery pack 203 and the protection capacitor C1 form a charging circuit LC1 (not shown) so as to charge the protection capacitor C1.

A process of controlling the electric motor to rotate in the braking state is as follows: the self-propelled operation switch 104 is released, the switching circuit 202 outputs a high-level data signal 1 that represents the shutdown signal, and when detecting that the bus is idle, the signal transmission control chip U3 in the switching circuit 202 outputs the shutdown signal to the controller 205 through bus communication. The controller 205 controls the second switching device Q1 to be turned off and controls the switching element Q18 in the relay control circuit to be turned off so that the contacts COM and NC of the relay 204 are connected. Further, the controller 205 controls the second switching device Q1 to be turned on so that the electric motor 201 forms a second conducting loop LC2 with at least the second switching device Q1, an inductor L, the diode D1, and the battery pack 203, and the electric motor 201 outputs generated electrical energy to charge the battery pack 203. That is to say, in the second conducting loop LC2, the electric motor 201 is equivalent to a generator before the rotational speed of the electric motor is reduced to zero, and the energy generated by the rotation may be recovered to the battery pack 203, that is, the electric motor 201 outputs a charge current to charge the battery pack 203. Therefore, partial energy recovery is achieved during a braking process of the electric motor, thereby saving the electrical energy outputted by the battery pack.

In an example, after the controller 205 controls the second switching device Q1 to be turned off, the controller 205 may control the relay 204 to be turned off immediately or in a third preset time period. The third preset time is greater than or equal to zero and less than or equal to the first preset time.

In the preceding example, the relay and the drive switch are controlled to be turned on in different sequences and time intervals, so as to control the electric motor to rotate. In this manner, the relay can switch the on state without a current in the circuit, avoiding the relay arcing damage and the failure of the relay caused by a high current, so that the mower has stable switching performance; and at the same time, the problem of excessive electromagnetic radiation caused by the usage of a high-current mechanical switch for electric motor control is avoided.

In the present application, any working mode that is different from the first working mode and the second working mode and enables the relay 204 to switch in a no-current state falls within the scope of the present application.

Figure 7:
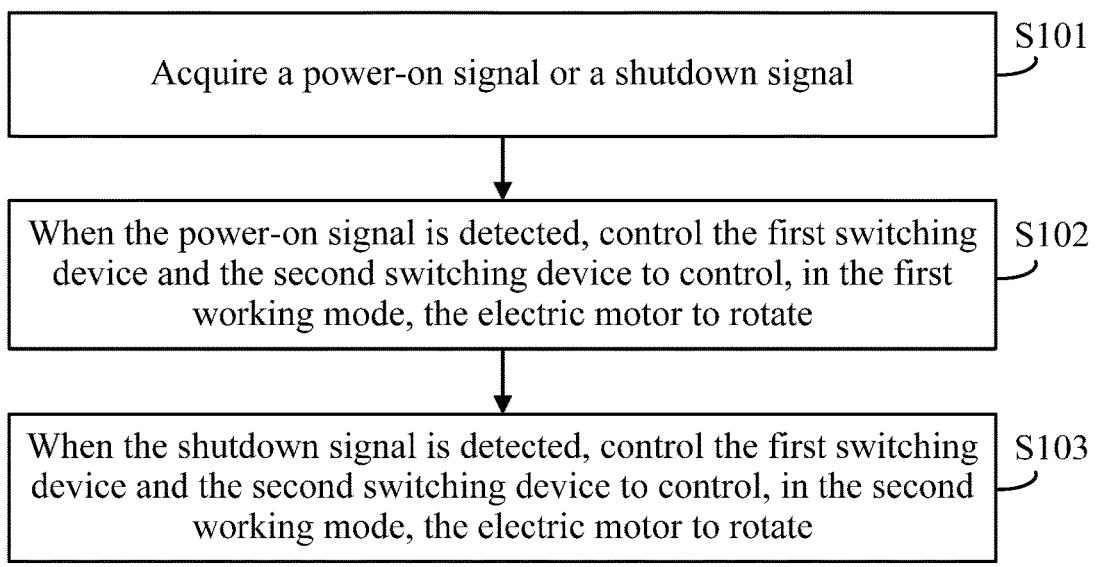
FIG. 7 is a flowchart of a control method for a mower as an example.

A control method for an electric motor in a mower is described below in conjunction with FIG. 7. The method includes the steps described below.

In S101, a power-on signal or a shutdown signal is acquired.

In S102, when the power-on signal is detected, the first switching device and the second switching device are controlled to control, in the first working mode, the electric motor to rotate.

In S103, when the shutdown signal is detected, the first switching device and the second switching device are controlled to control, in the second working mode, the electric motor to rotate.

Figure 8:
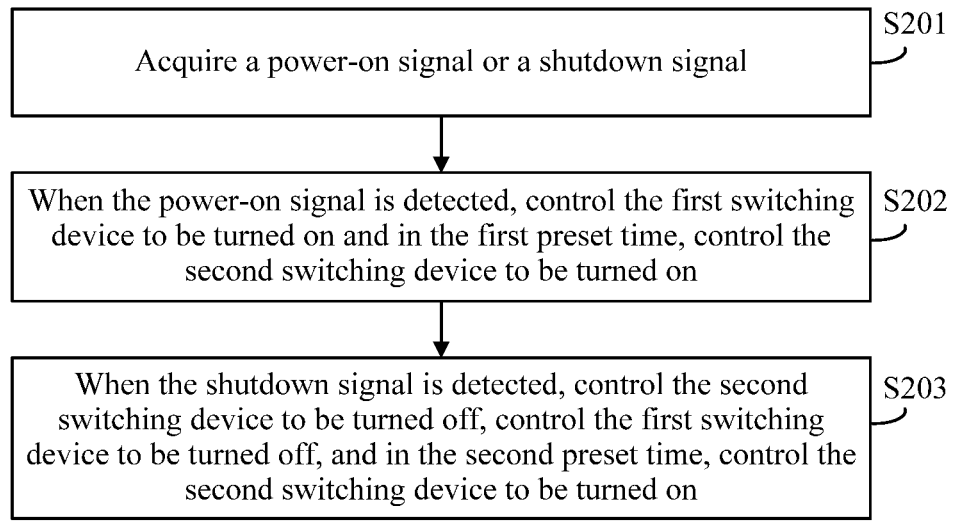
FIG. 8 is a flowchart of a control method for a mower as an example.

In an example, FIG. 8 shows another control method for an electric motor in the mower, and the specific steps are described below.

In S201, a power-on signal or a shutdown signal is acquired.

In S202, when the power-on signal is detected, the first switching device is controlled to be turned on and in the first preset time, the second switching device is controlled to be turned on.

In S203, when the shutdown signal is detected, the second switching device is controlled to be turned off, the first switching device is controlled to be turned off, and in the second preset time, the second switching device is controlled to be turned on.

Figure 9:
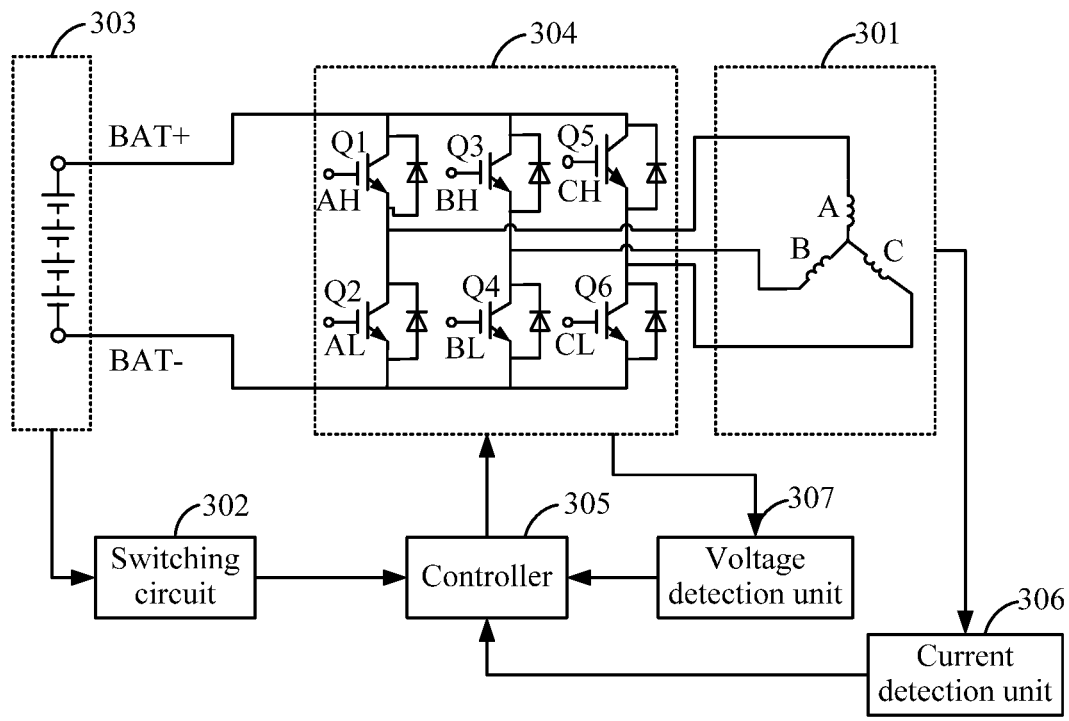
FIG. 9 is a circuit block diagram of a mower as an example.

Referring to a circuit block diagram of a mower shown in FIG. 9, the mower may include an electric motor 301, a switching circuit 302, a battery pack 303, an inverter circuit 304, a controller 305, a current detection unit 306, and a voltage detection unit 307.

The electric motor 301 is a brushless direct current motor.

The switching circuit 302 is mainly used for outputting signals for controlling the tool to be powered on or shut down. Specifically, for the structure of the switching circuit 302, reference may be made to the switching circuit shown in FIG. 3, and the details are not repeated here. In addition, for the communication manner between the switching circuit 302 and the controller 305, reference may be made to the bus communication circuit shown in FIG. 4, and the details are not repeated here.

The inverter circuit 304 is electrically connected to three-phase stator windings of the electric motor 301. When the on state of the switching element in the inverter circuit is switched, the energized state of the corresponding stator winding is also switched so that a rotation state of the electric motor, such as the rotational speed, a direction of rotation, or torque, is also changed. In an example, as shown in FIG. 9, the inverter circuit 304 includes six switching elements Q1, Q2, Q3, Q4, Q5, and Q6. Each gate terminal of the switching elements is electrically connected to the controller 305 and used for receiving a control signal from the controller 305. A drain or source of each switching element is connected to stator windings A, B, and C of the electric motor 301. The switching elements Q1 to Q6 receive the control signal from the controller 305 to change respective on states, thereby changing a current loaded to the stator windings of the electric motor 301 by the battery pack 303. In an example, the inverter circuit 304 may be a three-phase bridge driver circuit including six controllable semiconductor power devices (such as the FET, the BJT, and the IGBT), and each phase bridge circuit includes high-side switching elements and low-side switching elements. It is to be understood that the preceding switching elements may be any other types of solid state switches such as the IGBTs or the BJTs.

In an example, Q1, Q3, and Q5 are defined as the high-side switching elements of each phase bridge, and Q2, Q4, and Q6 are the low-side switching elements of each phase bridge. The high-side switching elements and the low-side switching elements of each phase bridge circuit are connected to the same phase winding. The switching elements Q1 and Q2 are connected to the first phase winding A, the switching elements Q3 and Q4 are connected to the second phase winding B, and the switching elements Q5 and Q6 are connected to the third phase winding C. The three-phase windings A, B, and C of the brushless motor are connected to the battery pack 303 through a bridge composed of the six switching elements Q1 to Q6. Particularly, when the controller 305 controls the high-side switching element to be turned on, the corresponding low-side switching element is turned off. That is to say, in the present application, the three groups of switching elements are in a complementary conduction mode, that is, when the high-side switching element is turned on, the corresponding low-side switching element is turned off, and when the low-side switch is turned on, the corresponding high-side switch is turned off. Therefore, in the present application, no open phase exists in the stator windings.

The current detection unit 306 is used for detecting a phase current of the stator windings in the electric motor in real time. The controller 305 may estimate the position of the rotor in the electric motor through the acquired phase current of the stator windings. Particularly, the controller 305 may calculate the rotational speed of the electric motor according to the phase current. Specifically, the rotational speed of the electric motor may be estimated according to relevant parameters of the phase current such as frequency.

The voltage detection unit 307 is used for detecting the magnitude of the bus voltage in the control circuit in real time. The controller 305 compares the acquired bus voltage data with a preset voltage threshold and when the bus voltage is greater than or equal to the voltage threshold, can control the brake element to change a control instruction so that the magnitude of the brake current is less than a set back-charge current threshold. Therefore, components in the control circuit can be prevented from being damaged by a relatively large back-charge current.

Figure 14:
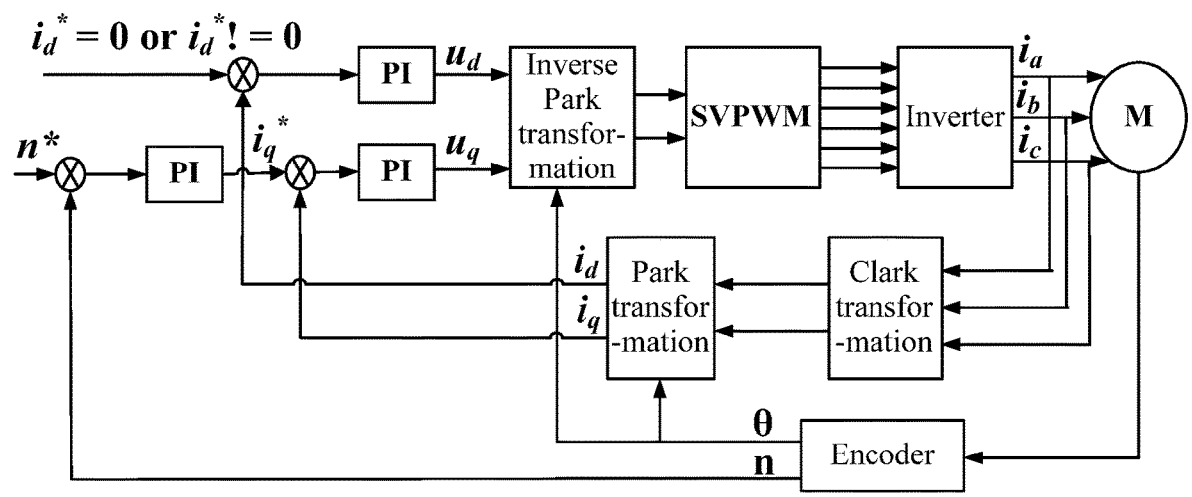
FIG. 14 is a schematic diagram of a control circuit for a mower as an example.

In an example, as shown in FIG. 14, the control circuit of the mower is a field-oriented control (FOC) double closed-loop control circuit having a speed regulation system with an inner current loop and an outer rotational speed loop. The inner current loop is nested in the outer rotational speed loop, a speed regulator outputs a given current, and the inner current loop actually controls the torque of the electric motor. Specifically, the stator current of the electric motor is decomposed into excitation component current $i_d^*$ and torque component current $i_q^*$. Under normal circumstances, the excitation current given value $i_d^*$ is set to 0, the expected rotational speed of the electric motor is set to a given value n* of a rotational speed loop, and an output value of a proportional-integral-derivative (PID) regulator into which the rotational speed loop is inputted is used as the given value $i_q^*$ of a current loop torque component. The outputs of $i_d^*$ and $i_q^*$ via the PID regulator are $u_d$ and $u_q$. $u_d$ and $u_q$ go through inverse Park transformation and space vector pulse-width modulation (SVPWM), a PWM wave is outputted to a drive terminal of an inverter, and the output of the inverter is three-phase currents $i_a$, $i_b$, and $i_c$ controlled by the electric motor. In this example, when the bus voltage is greater than the voltage threshold, the controller may control the inverter circuit to change the on state to change the current outputted by the electric motor so that the current $i_q$ that can back-charge the battery pack is less than the back-charge current threshold.

In an example, after determining the rotational speed of the electric motor according to the phase current, the controller 305 may calculate the position of the rotor in different methods according to different rotational speeds. For example, when the rotational speed is greater than or equal to a first rotational speed threshold, a back electromotive force of the stator windings may be estimated through the acquired phase current, and then the position of the rotor of the electric motor is estimated according to the back electromotive force. The method of calculating the position of the rotor according to the back electromotive force has proven applications, and the details are not described in detail here. For another example, when the rotational speed is less than or equal to a second rotational speed threshold, the controller may estimate the position of the rotor based on a high-frequency electrical signal loaded to the stator windings. The first rotational speed threshold is greater than the second rotational speed threshold. In a specific implementation, the controller 305 may output the high-frequency electrical signal, load the high-frequency electrical signal to the three-phase stator windings of the electric motor, and acquire a response signal outputted by the stator windings based on the high-frequency electrical signal. The response signal may be a high-frequency phase current signal having a high-frequency amplitude. Further, the controller may estimate the position of the rotor according to a relative relationship between the response signal and a preset rotor position. For example, the controller may estimate the position of the rotor according to a relative relationship between the high-frequency amplitude of the response signal and the preset rotor position. It is to be noted that since the component of the high-frequency response signal on a quadrature axis is correlated to a rotor position error, in the case where the amplitude of the high-frequency response signal converges to zero, the corresponding preset rotor position also converges so as to obtain a real rotor position. In the present application, a direction where the rotor is located is defined as a direct axis, and a direction perpendicular to the direct axis is defined as the quadrature axis.

In an example, the controller 305 controls the on states of the switching elements in the inverter circuit 304 according to the detected power-on signal and the estimated rotor position so that the electric motor obtains drive torque to drive the cutting blade to mow the grass or drive the driving wheels to travel. In addition, when the controller 305 detects the power-on signal outputted by the switching circuit 302, the on states of the switching elements in the inverter circuit 304 may be changed in conjunction with the current rotor position so that the electric motor 301 obtains brake torque for reverse acceleration to implement torque brake. The direction of the brake torque is opposite to the direction of the drive torque, that is, the brake torque is inverse torque.

In an example, the controller 305 may control the inverter circuit to change the on state according to the brake instruction outputted by the brake element and the estimated rotor position so that the electric motor obtains the brake torque for reverse acceleration. Particularly, the brake instruction includes a rotational speed reduction instruction for reducing the rotational speed of the electric motor, where the rotational speed reduction instruction is capable of including multiple rotational speed gears, and different rotational speed gears correspond to brake torque of different magnitudes. That is to say, when braking through the brake element, the electric motor obtains the brake torque for reverse acceleration, and the rotational speed is reduced to a certain smaller value or zero. If a brake gear included in the brake instruction is to reduce the rotational speed of the electric motor to a certain smaller value, after the rotational speed of the electric motor is reduced to a certain value, the electric motor can coast until the rotational speed is zero. It is to be understood that when the electric motor obtains the brake torque and brakes in real time, the rotational speed of the electric motor is reduced rapidly, but the direction of rotation of the electric motor does not change.

In the present application, under the action of the brake torque, the brake current for the reverse acceleration of the electric motor is generated in the stator windings of the electric motor, and the brake current flows out from the electric motor side to the battery pack to charge the battery pack, thereby achieving partial energy recovery while the electric motor brakes rapidly.

Figure 10:
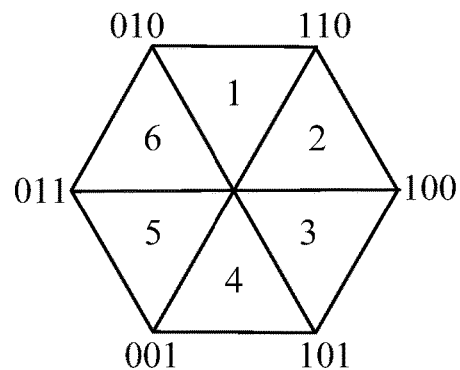
FIG. 10 is a schematic diagram illustrating control states in a mower as an example.

In the present application, the switching elements in the inverter circuit have six on states, and different on states correspond to different signal combinations outputted by the controller. Referring to a sector diagram shown in FIG. 10, it indicates that within one electrical cycle, six driving states, that is, the six on states, of the inverter circuit correspond to six signal combinations. Particularly, the correspondence between the on states of the switching elements in the inverter circuit and the signal combinations is shown in Table 1.

TABLE 1

| Signal combination | Switching elements that are turned on |
| --- | --- |
| (1, 1, 0) | Q1 Q3 Q6 |
| (1, 0, 0) | Q1 Q4 Q6 |
| (1, 0, 1) | Q1 Q4 Q5 |
| (0, 0, 1) | Q2 Q4 Q5 |
| (0, 1, 1) | Q2 Q3 Q5 |
| (0, 1, 0) | Q2 Q3 Q6 |

Figure 11:
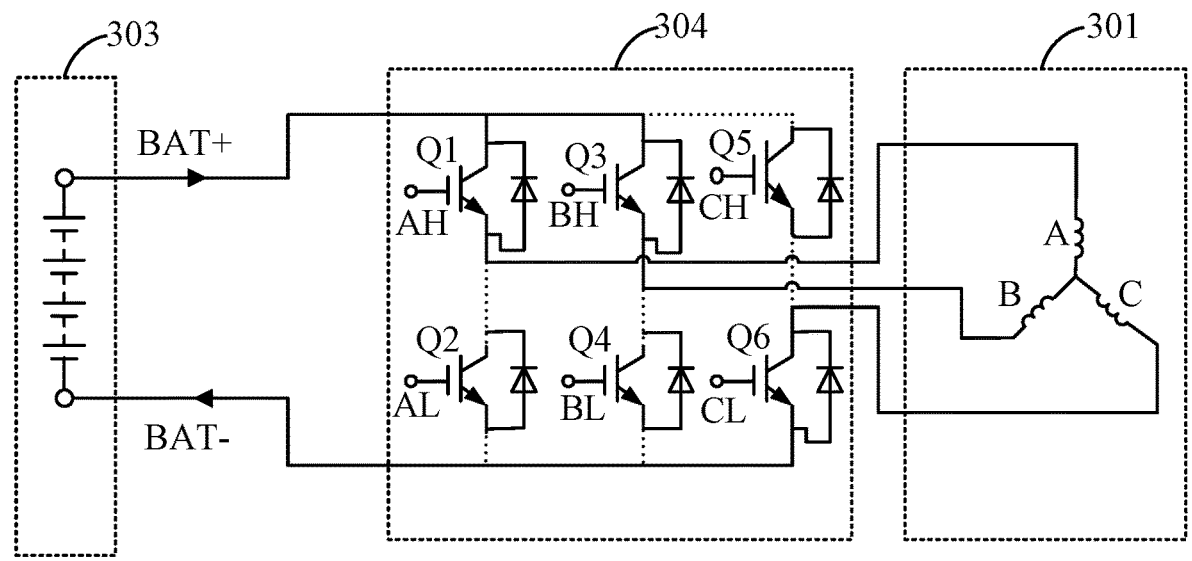
FIG. 11 is a schematic diagram of a battery pack power supply circuit in a mower as an example.
Figure 12:
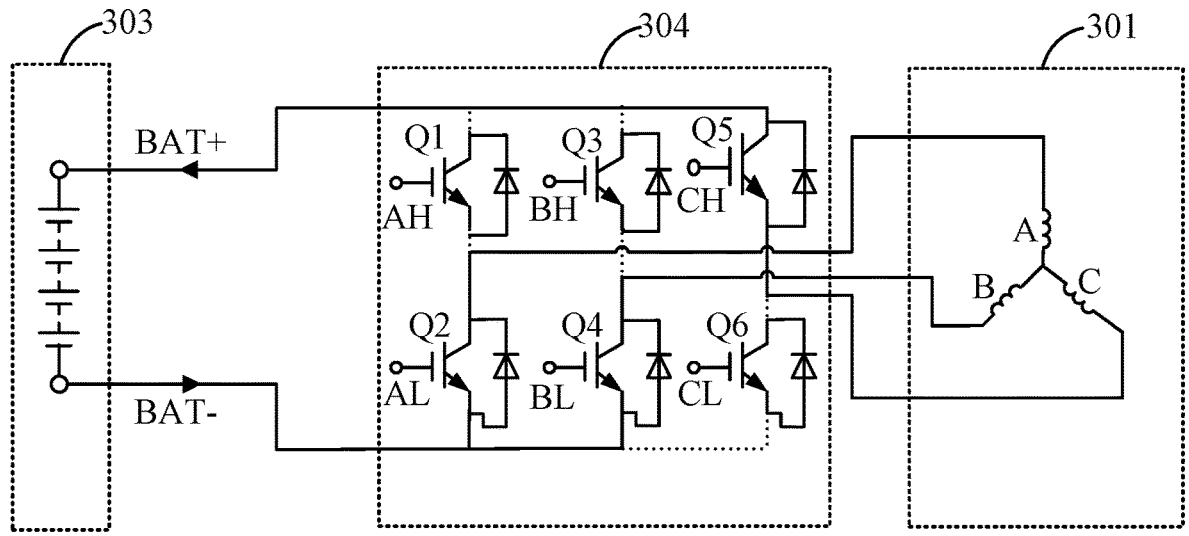
FIG. 12 is a schematic diagram of an electric motor discharging circuit in a mower as an example.

It is to be noted that in the present application, the three-phase stator windings of the electric motor are turned on under any signal combination, that is to say, no open phase exists in the three-phase windings during the driving and braking processes of the electric motor. A flow process of the current in the three-phase windings in the electric motor in which the three-phase windings are all turned on is not easy to describe. In the following, only the direction of the current in the bus in the circuit is used for representing the inflow or outflow of the three-phase current in the electric motor. For example, as shown in FIG. 11, under the action of the drive torque of the electric motor, the switching elements Q1, Q3, and Q6 in the inverter circuit are turned on, the corresponding switching elements Q2, Q4, and Q5 are turned off, and the direction of the current in the bus is from a positive terminal BAT+ of the battery pack to the electric motor, so as to supply power to the electric motor. As shown in FIG. 12, under the action of the brake torque of the electric motor, the switching elements Q2, Q4, and Q5 in the inverter circuit are turned on, the corresponding switching elements Q1, Q3, and Q6 are turned off, and the direction of the current in the bus is from the positive terminal BAT+ of the battery pack to the battery pack, so as to charge the battery pack.

In the example of the present application, the electric motor brakes through the inverse torque so that the electric motor brakes rapidly with relatively large reverse acceleration. At the same time, the brake current generated by the electric motor during the braking process charges the battery pack, thereby achieving partial energy recovery and reducing energy waste during braking.

Figure 13:
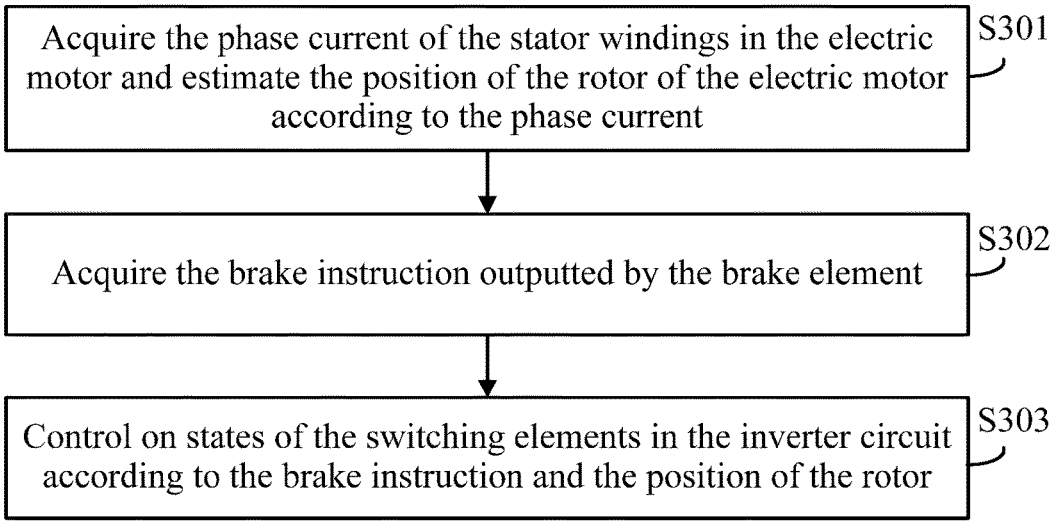
FIG. 13 is a flowchart of a control method for a mower as an example.

A control method for the electric motor braking in the mower is described below in conjunction with FIG. 13. The method includes the steps described below.

In S301, the phase current of the stator windings in the electric motor is acquired and the position of the rotor of the electric motor is estimated according to the phase current.

In S302, the brake instruction outputted by the brake element is acquired.

In S303, on states of the switching elements in the inverter circuit are controlled according to the brake instruction and the position of the rotor.

It is to be noted that the brake instruction includes the rotational speed reduction instruction for reducing the rotational speed of the electric motor, where the rotational speed reduction instruction is capable of including multiple rotational speed gears, and different rotational speed gears correspond to brake torque of different magnitudes.

What is claimed is:

1. A power tool, comprising:
   an electric motor;
   a battery pack for providing a power supply;
   a switching circuit for outputting a power-on signal or a shutdown signal;
   a first switching device for controlling a power-on state of the electric motor;
   a second switching device for driving the electric motor to rotate; and
   a controller electrically connected to at least the first switching device, the switching circuit, and the second switching device;
   wherein the controller is configured to:
   when the power-on signal is detected, control the first switching device and the second switching device to control, in a first working mode, the electric motor to rotate; and
   when the shutdown signal is detected, control the first switching device and the second switching device to control, in a second working mode, the electric motor to rotate.

2. The power tool of claim 1, wherein the controller is configured to:
   when the power-on signal is detected, control the first switching device to be turned on and in a first preset time, control the second switching device to be turned on, wherein the battery pack forms a first conducting loop with at least the first switching device, the electric motor, and the second switching device; and
   when the shutdown signal is detected, control the second switching device to be turned off, control the first switching device to be turned off, and in a second preset time, control the second switching device to be turned on, wherein the electric motor forms a second conducting loop with at least the first switching device, the battery pack, and the second switching device.

3. The power tool of claim 1, wherein the first switching device comprises a relay.

4. The power tool of claim 2, wherein in the first conducting loop, the battery pack outputs electrical energy to supply power to the electric motor; and in the second conducting loop, the electric motor outputs generated electrical energy to charge the battery pack.

5. The power tool of claim 2, wherein the second preset time is greater than or equal to zero and less than or equal to the first preset time.

6. The power tool of claim 1, wherein the power-on signal or the shutdown signal outputted by the switching circuit is transmitted to the controller through bus communication.

7. The power tool of claim 6, wherein the power tool further comprises a bus state detection circuit for detecting whether a signal transmission bus is idle, and the power-on signal or the shutdown signal outputted by the switching circuit is transmitted to the controller through the signal transmission bus when the signal transmission bus is idle.

8. The power tool of claim 1, further comprising:
   a driver circuit connected between the controller and the second switching device and used for controlling an on state and an on frequency of the second switching device.

9. The power tool of claim 1, wherein the power tool is a mower, the switching circuit comprises a self-propelled operation switch.

10. A control method for a power tool, wherein the power tool comprises an electric motor; a switching circuit for outputting a power-on signal or a shutdown signal; a battery pack for providing a power supply; a first switching device for controlling a power-on state of the electric motor; a second switching device for driving the electric motor to rotate; and a controller electrically connected to at least the first switching device, the switching circuit, and the second switching device; wherein the control method comprises:
    when the power-on signal is detected, controlling the first switching device and the second switching device to control, in a first working mode, the electric motor to rotate; and
    when the shutdown signal is detected, controlling the first switching device and the second switching device to control, in a second working mode, the electric motor to rotate.

11. The method of claim 10, further comprising:
    when the power-on signal is detected, controlling the first switching device to be turned on and in a first preset time, controlling the second switching device to be turned on, wherein the battery pack forms a first conducting loop with at least the first switching device, the electric motor, and the second switching device; and
    when the shutdown signal is detected, controlling the second switching device to be turned off, controlling the first switching device to be turned off, and in a second preset time, controlling the second switching device to be turned on, wherein the electric motor forms a second conducting loop with at least the first switching device, the battery pack, and the second switching device.

12. The method of claim 11, wherein the first switching device comprises a relay.

13. A power tool, comprising:
    an electric motor having a rotor and a plurality of stator windings;
    a brake element for outputting a brake instruction for braking the electric motor;
    a battery pack for providing a power supply for driving the electric motor;
    an inverter circuit having a plurality of semiconductor switching elements for switching energized states of the plurality of stator windings;
    a current detection unit for detecting a phase current of the plurality of stator windings in the electric motor; and
    a controller connected to at least the brake element, the current detection unit, and the inverter circuit;
    wherein the controller is configured to:
    acquire the phase current of the plurality of stator windings and estimate a position of the rotor of the electric motor according to the phase current; and acquire the brake instruction outputted by the brake element and control on states of the plurality of switching elements in the inverter circuit according to the brake instruction and the position of the rotor so that the electric motor obtains brake torque for reverse acceleration to implement torque brake.

14. The power tool of claim 13, wherein under an action of the brake torque, the plurality of stator windings of the electric motor generate a brake current; and the brake current flows into the battery pack to charge the battery pack.

15. The power tool of claim 13, wherein the brake instruction comprises a rotational speed reduction instruction for reducing a rotational speed of the electric motor, wherein the rotational speed reduction instruction is capable of comprising a plurality of rotational speed gears, and different rotational speed gears correspond to brake torque of different magnitudes.

16. The power tool of claim 13, wherein the controller is configured to:
calculate a rotational speed of the electric motor according to the phase current of the plurality of stator windings;
when the rotational speed is greater than or equal to a first rotational speed threshold, estimate a back electromotive force of the plurality of stator windings based on the phase current and estimate the position of the rotor of the electric motor according to the back electromotive force; and
when the rotational speed is less than or equal to a second rotational speed threshold, estimate the position of the rotor of the electric motor based on a high-frequency electrical signal loaded to the plurality of stator windings.

17. The power tool of claim 16, wherein the controller is configured to:
when the rotational speed is less than or equal to the second rotational speed threshold, output the high-frequency electrical signal, load the high-frequency electrical signal to the plurality of stator windings of the electric motor, and acquire a response signal outputted by the plurality of stator windings based on the high-frequency electrical signal; and
estimate the position of the rotor of the electric motor according to a relative relationship between the response signal and a preset rotor position.

18. The power tool of claim 14, further comprising:
a voltage detection unit for detecting a bus voltage of the inverter circuit;
wherein the controller is configured to:
acquire the bus voltage; and
when the bus voltage is greater than a preset voltage threshold, control the brake element to change a control instruction so that a magnitude of the brake current is less than a set back-charge current threshold.

* * * * *